United States Patent [19]

Iizuka

[11] 4,167,931
[45] Sep. 18, 1979

[54] APPARATUS TO CONTROL FUEL SUPPLY TO A MULTICYLINDER INTERNAL COMBUSTION ENGINE BY DISABLING ONE OR MORE ENGINE CYLINDERS IN CERTAIN ENGINE OPERATING CONDITIONS

[75] Inventor: Haruhiko Iizuka, Yokosuka, Japan

[73] Assignee: Nissan Motor Company, Limited, Yokohama, Japan

[21] Appl. No.: 885,003

[22] Filed: Mar. 9, 1978

[30] Foreign Application Priority Data

Mar. 9, 1977 [JP] Japan .......................... 52/27391[U]

[51] Int. Cl.² .................................... F02D 13/06
[52] U.S. Cl. ............... 123/198 F; 123/90.27; 123/90.43; 123/90.46
[58] Field of Search ............. 123/198 F, 90.27, 90.32, 123/90.43, 90.46

[56] References Cited

U.S. PATENT DOCUMENTS

| | | | |
|---|---|---|---|
| 1,955,844 | 4/1934 | Noolman | 123/90.27 |
| 3,153,404 | 10/1964 | Van Slooten | 123/90.43 |
| 3,855,981 | 12/1974 | Loon | 123/90.27 |
| 3,964,455 | 6/1976 | Brown | 123/90.43 |
| 4,050,435 | 9/1977 | Fuller, Jr. et al. | 123/198 F |
| 4,064,861 | 12/1977 | Schulz | 123/198 F |
| 4,104,991 | 8/1978 | Abdoo | 123/198 F |
| 4,107,921 | 8/1978 | Lizuka | 123/198 F |
| 4,114,588 | 9/1978 | Jordan | 123/198 F |

Primary Examiner—Ira S. Lazarus

[57] ABSTRACT

The apparatus is particularly provided for an overhead cam type engine in which cam lobes directly act upon the upper side of rocker arms. A hydraulic piston is formed under a floating stud pivotally supporting the rocker arm thereon for cooperation therewith and is hydraulically operated through a solenoid-operated directional control valve between a normally operating position and a locking position in which an engine valve is deactivated. The control valve is actuated from an electronic system to render one or more cylinders inactive for certain engine power output.

7 Claims, 4 Drawing Figures

4,167,931

APPARATUS TO CONTROL FUEL SUPPLY TO A MULTICYLINDER INTERNAL COMBUSTION ENGINE BY DISABLING ONE OR MORE ENGINE CYLINDERS IN CERTAIN ENGINE OPERATING CONDITIONS

BACKGROUND OF THE INVENTION

This invention generally concerns automotive multicylinder internal combustion engines and particularly to apparatus for selectively shutting off one or more cylinders of the engine when reduced power output can operate the vehicle adequately.

Nowadays, automotive engineers and manufacturers are greatly interested in the technology of controlling fuel supply to some of the engine cylinders for the sake of world-wide requirement for fuel economy. They have already proposed several types of apparatus which incorporate this technology by disabling or deactivating the intake and exhaust valves of the corresponding cylinders when required. Especially for a carburetor-controlled engine, there is known a mechanical device for such deactivation which collapses or locks a hydraulic valve lifter in a position in which the intake or exhaust valve is kept shut off in any angular position of a camshaft. The device per se is actuated from an electric and electronic control apparatus responsive to one or more engine parameters.

This type of device is however not applicable to an overhead cam type engine lacking any hydraulic lifter. Besides, since locking of a hydraulic lifter is mostly accomplished by mechanical means common to all the cylinders, the number and the combination of inactive cylinders can not be altered in dependence on engine power requirement.

It is therefore a general object of this invention to provide an apparatus to cut off fuel delivery to one or more cylinders of a multi-cylinder engine by deactivating intake and exhaust valves of the corresponding cylinders when the total amount of fuel required for the engine in a particular operation mode is relatively small, thus minimizing fuel consumption.

Another object of this invention is to provide an apparatus of the aforementioned type which is designed and constructed for use with an overhead cam type engine in which cam lobes act on the intake and exhaust valves to lift them only through stud-mounted rocker arms.

Still another object of this invention is to provide an apparatus of the aforementioned type in which the number and the combination of the inactive cylinders can be altered at will in accordance with engine power requirement.

A further, more specific object of this invention is to provide an apparatus of the aforementioned type in which a floating stud for the rocker arm is hydraulically operated to move between a normally operating position and a locking position in which the engine valves are deactivated.

Other objects of this invention are a simple structure without any important modification of the engine in use, and therefore reduced manufacturing cost.

SUMMARY OF THE INVENTION

Briefly, the apparatus embodying this invention comprises a floating rocker-arm stud for each engine valve having a hydraulic piston formed at or under the bottom portion thereof. The piston is exposed to a hydraulic chamber to which fluid under pressure is delivered through a solenoid-operated directional control valve provided one for each engine valve. The solenoid is controlled by an electronic control system which commands the number and the combination of the cylinders to be disabled in response to engine variable signals including intake air quantity and engine revolution speed signals.

Other objects, features and advantages will be apparent as the following explanation proceeds with reference to the accompanying drawings.

DESCRIPTION OF PRIOR ART AND THE PREFERRED EMBODIMENT

Figure 1:
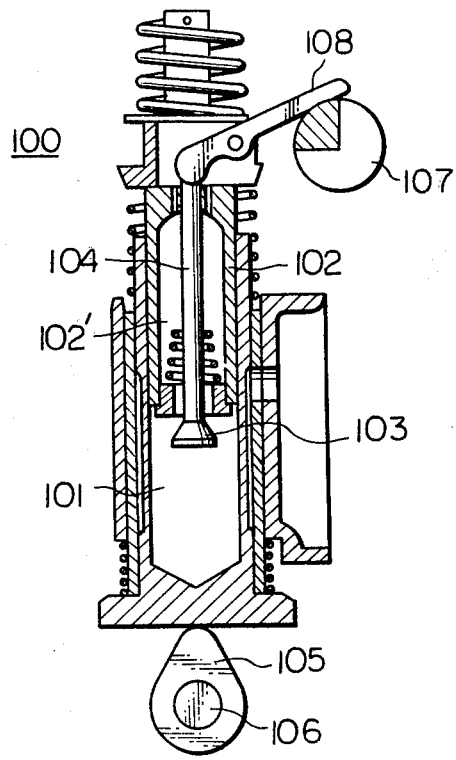
FIG. 1 is a sectional view illustrating an example of a prior art apparatus to disable engine cylinders by locking a hydraulic lifter or oil tappet.

In FIG. 1, a numeral 100 designates a typical oil tappet containing a fluid chamber 101 within which a piston 102 is slidable. A valve 103 with a stem 104 is able to block communication between the fluid chamber 101 and a bore 102' within the piston 102. A cam lobe 105 of well known oval shape mounted on a camshaft 106 is engageable with the bottom surface of the oil tappet body to raise the same. A valve deactivating mechanism in this example comprises a shifter or cam rod 107 with a raised portion and lowered portion (no numeral). The cam rod 107 is rotatably operated from an electric command system responsive to one or more cylinder disable signals, though not shown. A pivot lever 108 pivotally contacting the end of the valve stem 104 opposite to the valve head follows the contour of the shifter rod as it rotates.

When the cam rod swings the pivot lever 108 in counterclockwise direction in FIG. 1, the pivot lever 108 urges the stem 104 downwardly. The fluid in the chamber 101 is then admitted into the bore 102' via the open valve 103. Thus, the piston 102 is kept in its lowered position shown, despite that the cam 105 raises the body of the tappet. The intake and exhaust valves of the corresponding cylinder are thus kept closed to cut off fuel delivery to the cylinder.

Figure 2:
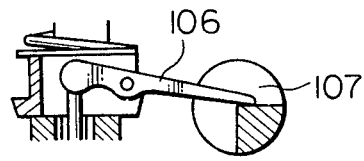
FIG. 2 is a partial fragmentary view illustrating another mode of operation of the apparatus shown in FIG. 1.

As the cam rod 107 is turned and engages the pivot lever through its lowered portion, the pivot lever swings in clockwise direction to a position shown in FIG. 2; the valve 103 acts like a usual check valve. Accordingly, as the tappet body is raised by the cam 105, the pressurized fluid in the chamber 101 raises the piston 102 and the normal engine operation with all cylinders working is restored.

As has been mentioned before briefly, this type of a valve deactivating apparatus is not applicable to an OHC type engine lacking hydraulic lifter. It is also pointed out that since the cam rod, with preselected number, location and configuration of the cam sections, is provided in common to all the cylinders, the number and the combination of the cylinders to be disabled can be altered only by exchanging the complete cam rod.

The invention advantageously eliminates this problem and provides an engine cylinder deactivating apparatus especially designed for use with an OHC type engine.

Figure 3:
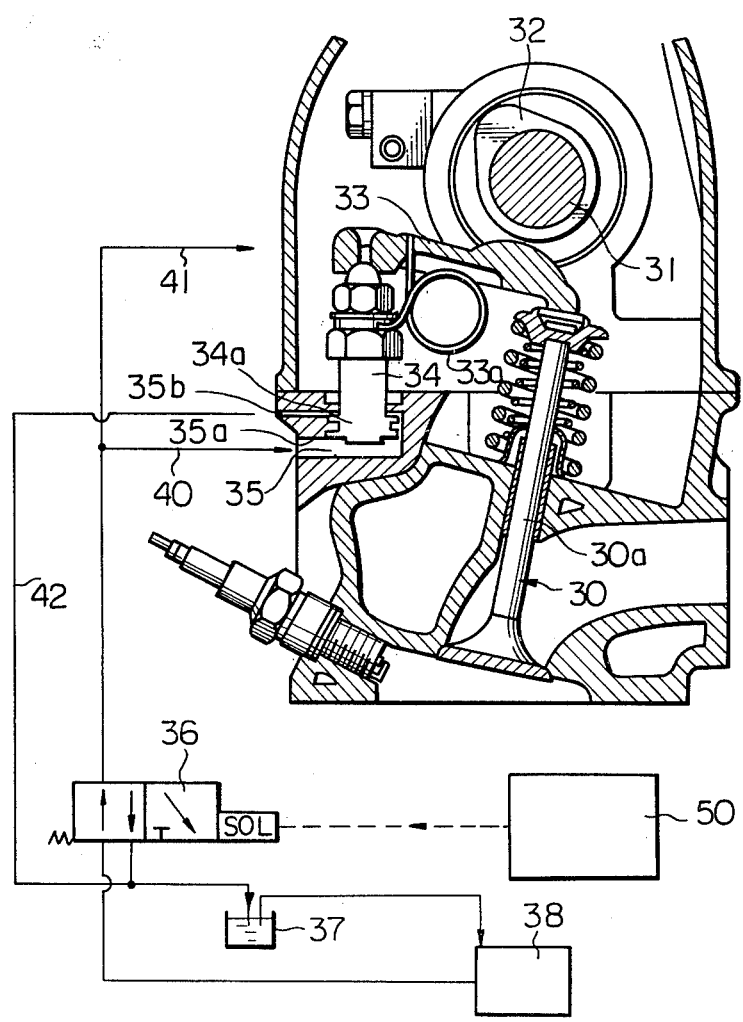
FIG. 3 is a schematic view partly in section of a preferred embodiment of an apparatus according to this invention.

Reference is now made to FIG. 3 illustrating the cylinder head of an OHC type engine where a camshaft 31 carrying cam lobes 32 thereon is located above the cylinder head. Each cam lobe through its raised portion exerts a push on the stem 30a of an intake valve 30 via a rocker arm 33 in a manner well known. An end of the rocker arm 33 opposite to the valve stem 30a is held in pressure contact with the round head of a mounting pivot or stud 34 by means of a coil spring 33a for limited oscillating movement.

According to the invention, the stud 34 is floating and vertically movable within a hydraulic chamber 35. A piston 34a is integrally formed on the bottom portion of the stud and is exposed to the fluid under pressure contained in the chamber 35. The piston 34a may be a separate one located under the stud 34 instead of being integral therewith, though not shown. The piston 34 and the chamber 35 together thus serve as a sort of hydraulic cylinder device.

The hydraulic fluid from a source of fluid under pressure 38 is delivered through a fluid line 40 to an inlet port 35a of the chamber 35 via a solenoid-operated directional control valve 36 that will be later described. Another line 41 branching from the line 40 leads to a fluid chamber inlet for a non-illustrated engine exhaust valve. The fluid through an outlet port 35b is returned through a fluid line 42 to an oil reservoir 37. The solenoid of the valve 36 is operated from an electronic control system 50 as will be described later.

The mechanical part of the apparatus shown in FIG. 3 operates in a manner to be described.

When the signal from the electronic system 50 commands a normal engine operation with all the cylinders active, the solenoid of the directional control valve 36 assumes the position shown, then the fluid from the source 38 enters the chamber 35 through the line 40 and maintains the piston 34a and stud 34 in their raised, normally operating position. Thus, the cam lobe 32 in its valve opening position urges the rocker arm 33 to lift the intake valve 30 from its seat. Fuel delivery to the cylinder accordingly takes place in an ordinary way.

As soon as the electronic system 50 delivers a signal for disabling a cylinder to the solenoid, the directional control valve 36 prohibits fluid flow through the line 40, while allowing fluid to be discharged through the line 42 into the reservoir 37. The piston 34a on the stud 34 is now under no or little action of hydraulic fluid thus assuming a lowered, locking position. The cam push exerted on the rocker arm 33 in this state causes downward movement of the stud 34 together with the rocker arm. Consequently, no downward movement of the valve stem 30a of the valve 30 takes place; the intake valve 30 is maintained in the deactivated state.

Generally the same operation steps as explained above are taken by the apparatus for deactivation of the exhaust valve so that the intake and exhaust valves of a cylinder are simultaneously disabled.

The required number of the solenoid valves depends on the number and combination of the cylinders to be disabled. Taking an example of a six-cylinder engine, directional control valves should be installed one for each cylinder, if the number and the combination are both varied among all the six cylinders. If the number of the inactive cylinders is fixed for instance to three and their combination is also unchanged, only one valve is enough in common to all the cylinders. Two solenoid valves may be necessary when the number of the inactive cylinders is fixed but a particular combination of the cylinders is occasionally replaced by another combination. Three valves should be installed in case that the number of inactive cylinders is changed among the preselected three cylinders.

The electronic system is now described with reference to FIG. 4. The illustrated embodiment of the electronic system contemplates to shut off at the maximum three of the six cylinders with a suitable combination that will be later specified. The total quantity of engine intake air Q should be maintained within a predetermined range as between $a_1N$ and $a_2N$, where N is a revolution per minute of a six-cylinder engine. In other words, the value $Q/N$ should exist between two predetermined values $a_1$ and $a_2$, where $a_1$ is greater than $a_2$.

Figure 4:
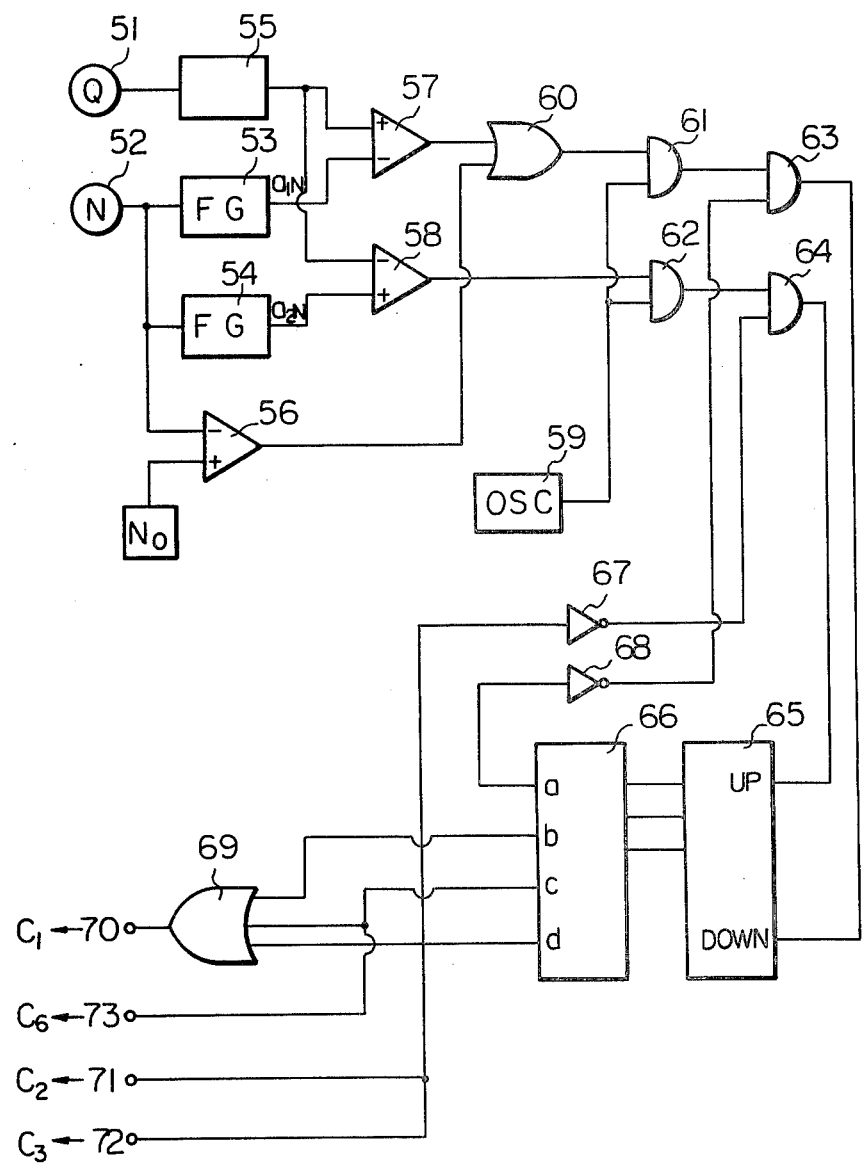
FIG. 4 is a block circuit diagram of an electronic control system used with the apparatus shown in FIG. 3.

In FIG. 4, an intake air quantity sensor 51 detects the total quantity of the intake air entering the engine. The signal from the air quantity sensor is delivered to one input of each of comparators 57 and 58 through a correction device 55 which will be later mentioned. An engine speed sensor 52 feeds an output signal representing an engine revolution speed per minute to two function generators 53 and 54. The function generator 53 delivers a function signal $a_1N$ to the other input of the comparator 57, while the function generator 54 a function signal $a_2N$ to the other input of the comparator 58. The comparator 57 produces a high level or "1" output when Q is greater than $a_1N$, otherwise producing a low level or "0" output. Likewise, the comparator 58 produces a "1" output when Q is smaller than $a_2N$. The engine speed signal from the sensor 52 is fed also to one output of another comparator 56, whose other input receives a reference signal representing a predetermined, relatively low engine speed $N_o$. The comparator 56 produces a "1" output when the engine speed N is lower than the reference level $N_o$. The outputs from the comparators 56 and 57 are fed to the inputs of an OR gate 60 so that an output "1" is passed to an AND gate 61 when the both or either one of the comparators 56 and 57 produce "1" outputs. The output from the comparator 58 is directly delivered to an AND gate 62. Pulse generator 59 oscillates a series of pulses of a certain frequency which are delivered to both the AND gates 61 and 62.

When Q is smaller than $a_2N$ under light load condition of the engine at the engine speed N higher than the reference level $N_o$, the output from the comparators 56 and 57 are both "0" so that the OR gate 60 also produces a "0" output. Thus, the pulses from the pulse generator at one input of the AND gate 61 are inhibited from passing through the AND gate. On the other hand, the comparator 58 produces a "1" output so that the pulses from the generator 59 are allowed to appear on the output of the AND gate 62. These pulses are then passed through an AND gate 64 that will be described later, to an up count input of an up-down counter 65 which counts up one by one upon each receiving an input pulse.

The counter 65 provides an output in binary-coded decimal representation to the input of a decoder 66 which translates the input to a decimal output and produces a high or low level signal on each output lead a, b, c, or d. If the decimal output of the decoder 66 is zero, the output on the lead a is "1", while "0" output appears on other leads b, c, and d. With the decimal output "1", the signal "1" appears on the lead b with "0" signal on other leads a, c and d. With the decimal output 2, the signal "1" appears on the lead c with "0" signal at other leads. With the decimal output 3, a signal "1" appears on the lead d with "0" signal at other leads.

The lead a is connected to an AND gate 63 through an inverter 68, while the lead d to an AND gate 64 through another inverter 67. The output leads b, c and d are all connected to an output terminal 70 via an OR gate 69. Moreover, the lead c is directly connected to the output terminal 73 and the lead d to the output terminals 71 and 72, respectively. The output terminals 70, 71, 72, 73 are respectively for the first, second, third and sixth cylinders to provide a suitable combination of the inactive cylinders as will be later apparent.

When the input pulses are applied to the up count mode of the counter 65 under the condition that all the six cylinders are working, the decoder outputs are varied to reduce the number of the active cylinders one by one at a predetermined interval until deactivation of three cylinder is reached. Specifically, when the signal "1" appears on the lead b, the output of the OR gate 69 delivers a "1" signal to the terminal 70 so that only the first cylinder is disabled. When the signal"1" is on the lead c, the first and sixth cylinders are simultaneously disabled. As soon as the output "1" appears at the lead d, the first, second and third cylinders are disabled and at the same time, the output of the AND gate 64 is inverted to "0" by the inverter 67. The counter therefore no longer counts up so that the output of the decoder 66 does not exceed the decimal number 3, even if the quantity of intake air Q is yet smaller than $a_2N$.

When the intake air quantity is greater than $a_1N$ and/or when the engine speed is lower than the reference level $N_o$, the signal "1" appears on the OR gate 60. The AND gate 61 then allows the pulses from the pulse generator 59 which are fed to the down count input of the up-down counter. Thus, the counter counts down to increase the number of the active cylinders one by one in reverse order to the disabling operation as described above. As soon as a "1" output appears on the lead a of the decoder 66, the inverter 68 produces a "0" output which turns the output of the AND gate 63 to "0". The counter thus no longer counts down, and decimal output of the decoder is maintained at zero.

As long as the engine speed is lower than $N_o$, the pulses are passed through the AND gates 61, 63 to the down count input of the counter 65, regardless of the sensed quantity of engine intake air. Consequently, the pulses will be fed to both the up count input and down count input of the counter 65 simultaneously, in case that Q is smaller than $a_2N$ at an engine speed lower than $N_o$. The counter is constructed of a so-called down preference type so that an input at the down count input cancels an input at the up count input to stop the up count mode operation. Thus, whenever the engine speed is lower than the relatively low level $N_o$, the number of active cylinders is increased until all the cylinders are enabled.

As has been mentioned previously, the first cylinder is disabled when the number of the non-working cylinder is one; the first and sixth cylinders if the number is two, and the first, second and third cylinders if the number is three, are disabled. When this arrangement is used with the typical six cylinder engine having a firing order of 1, 5, 3, 6, 2, 4, an interval at which the cylinders are disabled can be kept constant regardless of the number of the inactive cylinders. For engines with other numbers and firing orders, any other combination of the inactive cylinders is available to maintain a constant interval of deactivation.

The correction device 55 provides a signal modifying the intake air quantity signal in dependence on the number of the inactive cylinders. When the six cylinders are all enabled, this device passes the input from the sensor 51 unchanged to the comparators 57 and 58. Otherwise, the device provides signals representing 6/5 times the input when 5 cylinders are enabled, 6/4 times when 4 cylinders are enabled and 6/3 times when 3 cylinders are enabled, respectively.

What is claimed is:

1. A combination comprising
an overhead cam type multi-cylinder engine having
an engine intake valve and exhaust valve for each cylinder,
a pivotal rocker arm for each engine valve,
at least one camshaft for all the cylinders located above the rocker arms and having a plurality of cam lobes which are at their valve opening position engageable with the rocker arms to force the same to open the engine valve,
a floating stud pivotally supporting said rocker arm thereon, said stud having a raised position for normal action of the cylinder and a lowered position in which the rocker arm is disengaged from the engine valve despite that the cam lobe assumes the valve opening position to disable the cylinder,
means producing at least two signals representing engine operation parameters,
means determining the number and the combination of the cylinders to be disabled in accordance with the engine parameter signals and producing a disable signal for each corresponding cylinder in dependence on the given number and combination, and
means for normally maintaining said floating stud in the raised position while bringing the same into the lowered position in response to said disable signal.

2. A combination of an overhead cam type multicylinder engine having engine intake and exhaust valves for each cylinder, a rocker arm for each engine valve pivotally mounted on a stud, a camshaft located above the rocker arms and having a plurality of cam lobes which are in their valve opening position engageable with the rocker arms to force the same to open the valve,
with an apparatus for disabling one or more cylinders of the engine comprising
a hydraulic piston mounted under said stud for cooperation therewith and exposed to a hydraulic chamber to be vertically slidable within said hydraulic chamber together with said stud, said stud having a raised position for normal action of the cylinder when fluid from a source of fluid under pressure fills the hydraulic chamber and a lowered position in which the rocker arm is kept disengaged at any position of the cam lobe when the fluid discharges out of the chamber,
sensing means producing at least two signals representing engine operating parameters,
an electrically actuable directional control means for controlling flow of fluid into and out of the hydraulic chamber, electronic means for determining the number and combination of the cylinders to be disabled in accordance with the engine parameter signals and selectively delivering a signal indicating delivery of fluid into said chamber and a signal indicating discharge of fluid from said chamber to said directional control means of one corresponding cylinder in accordance with the given number and combination of the cylinders to be disabled.

3. A combination as defined in claim 2, in which said hydraulic piston is integrally formed on the bottom of said stud.

4. A combination as defined in claim 2, in which said sensing means comprises an engine intake air quantity sensor and engine revolution speed sensor.

5. A combination as defined in claim 4, in which said electronic means comprises
- a first function generator producing a first function signal representing a predetermined higher level of intake air quantity as a function of an engine speed signal,
- a second function generator producing a second function signal representing a predetermined lower level of intake air quantity as a function of an engine speed signal,
- a first means for producing a high level output signal when the output from the intake air quantity sensor is higher than the level of said first function signal,
- a second means for producing a high level output signal when the output from the intake air quantity sensor is lower than the level of said second function signal,
- a pulse generator oscillating a series of pulses of a certain frequency,
- a first AND gate passing the pulses from the pulse generator to its output upon receiving high level output from the first means,
- a second AND gate passing the pulses from the pulse generator upon receiving the high level output from the second means,
- a counter having up and down count modes and operating to count up the pulses from the first AND gate and to count down the pulses from the second AND gate,
- a decoder for translating the counter output to decoded control signals for delivering said signals respectively to directional control means for said cylinder to be disabled through a plurality of output leads,
- an OR gate having a plurality of inputs connected to a portion of said plurality of output leads and an output connected with one of directional control means, and
- means to stop the up or down count operation when predetermined counts are reached in said counter.

6. A combination as defined in claim 5, further comprising a third means for producing a high level output signal when the engine speed signal is higher than a predetermined reference level and an OR gate delivering a high level output signal to said first AND gate when either or both the first and third means produce the high level output signals.

7. A combination as defined in claim 5, further comprising means interposed between said intake air quantity sensor and said first means for modifying the intake air quantity signal in dependence on the number of the disabled cylinders.

* * * * *